Sept. 19, 1961     K. ORLOV     3,000,114
COMBINED BALANCE FOR SOLVING EQUATIONS AND INEQUALITIES
Filed Oct. 12, 1959
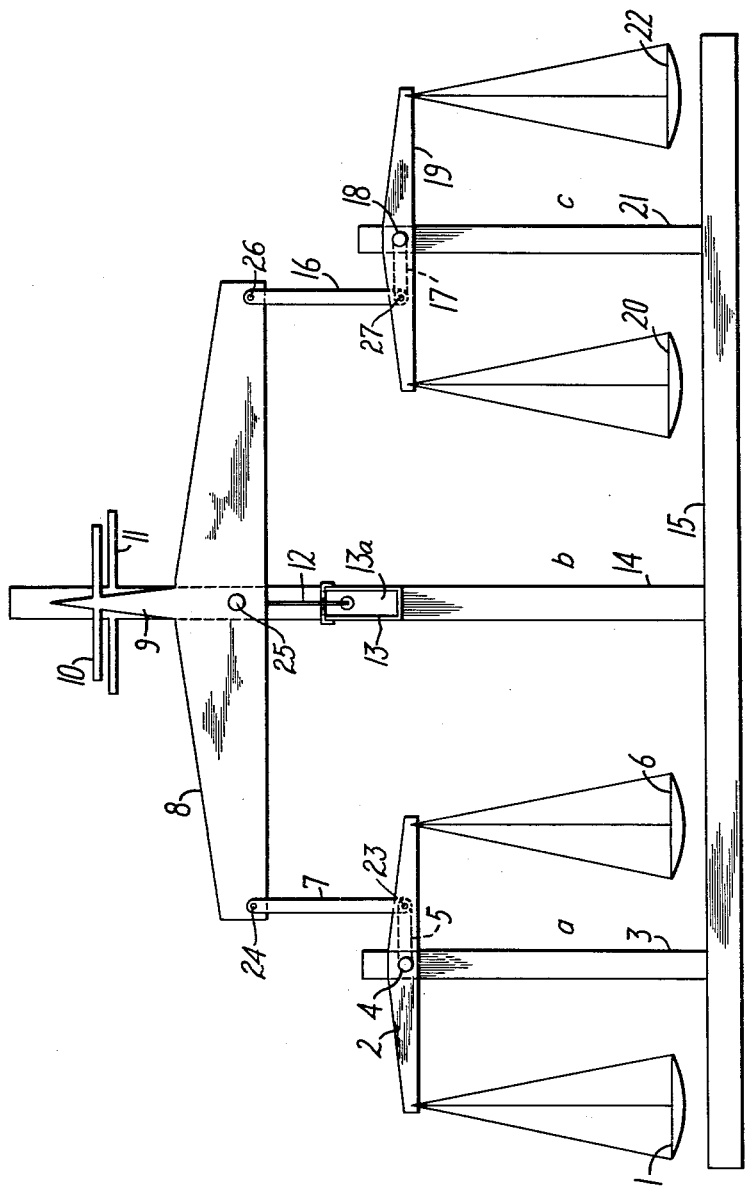

United States Patent Office 3,000,114
Patented Sept. 19, 1961

3,000,114
COMBINED BALANCE FOR SOLVING EQUATIONS AND INEQUALITIES
Konstantin Orlov, 5 Misarska, Belgrade, Yugoslavia
Filed Oct. 12, 1959, Ser. No. 845,698
Claims priority, application Yugoslavia Oct. 14, 1958
4 Claims. (Cl. 35—30)

The invention relates generally to teaching appliances and more particularly to a visual demonstration device for the visual solving of equalities and inequalities.

A feature of the invention is the physically balancing of weights given positive and negative values in a device that visually indicates the equality of an equation or which side of an inequality is greater.

The invention comprises a balance scale having each end of its pivotally mounted balance beam connected to the opposing ends of the balance beams of two smaller balance scales each said smaller scale having scale pans suspended from the respective ends of their balance beams. The scales have a common bore and the two smaller ones are symmetrically positioned with respect to the center larger scale. The smaller scales represent the sides of an equation with the scale pans on oppositely disposed ends of the respective beams of the scales for receiving positive weights and the scale pans on opposing ends of the beams for receiving negative weights. Markers at the top of the center larger scale indicate the balance of the equation in the mathematical symbols employed therefor.

Other objects and features and a complete understanding of the invention may be had by referring to the following description and claims, taken in conjunction with the accompanying drawing in which:

FIG. 1 is a schematic drawing illustrating a side view of the invention.

In FIGURE 1 the invention is illustrated as a combined balance. The combined balance is composed of three balance scales, $a$, $b$ and $c$, each of them having characteristics of an ordinary balance. These individual parts are connected with one another so as to form a united system. The middle scale $b$ consists of a stand 14 fixed upon the base 15. To the stand a narrow and short indicator 11 is attached, which, together with a similar indicator 10 makes the sign of equality = or of inequality <(less than) or >(greater than) according to whether the system is in equilibrium or on the beam 8 is lowered to the one or the other side. The indicator 10 is fastened to a pointer 9 and is consequently movable together with the pointer 9, whereas the indicator 11 is fixed. The task of the indicators 10 and 11 is to translate automatically the physical state of the balance into the mathematical language, i.e. to express that the algebraic value of weights on the left balance $a$ is equal =, greater >, or smaller < than the algebraic value of the weights on the right balance $c$. The balance beam with equal arms 8 is attached to the stand 14 by a pivot 25 in the usual way with balances. On both its ends, instead of scale pans there are two vertical levers 7 and 16, which are pivotally connected with them at pivots 24 and 26 respectively, and there is a needle 12 which enters into a small box 13 and is releasably held centered therein. The lid 13$a$ of this small box is movable. When this lid occupies one of its positions, the motion of the balance is completely checked-arrested, while in another the balance is movable, but this movability is limited, owing to the vertical walls of the box 13 which restricts the movement of the needle 12. The left scale $a$ consists of a stand 3, fixed upon the base 15. Through this stand penetrates a shaft 4 which is rotative and to which a lever 5 is firmly fastened. The latter is pivotally connected at pivot 23 to the vertical lever 7. In this way the left scale $a$ is joined to the middle scale $b$. The shaft 4 is set in such a way as to minimize the friction between it and the stand 3. To the shaft 4 a balance beam 2 with equal arms is firmly attached. It has scale pans 1 and 6 suspended on its respective ends. Either scale pan can be divided, if need be, into two, three, four etc. compartments by putting partitions on it which can be removed again. The scale pan 1 is marked with "plus" + and the scale pan 6 with "minus" —. The right scale $c$ is completely symmetric to the left one $a$. To the parts 1, 2, 3, 4, 5, 6, 7, 23, 24, 28 on the left side $a$ correspond respectively the following parts on the right side $c$: 22, 19, 21, 18, 17, 20, 16, 27, 26 and 29. The whole apparatus is made of metal or some other material as, for instance, plastics or of several different materials.

The balance is equipped with weights. These are, on one hand, the normal weights of known mass indicated on them, and on the other hand the weights representing the unknown quantities $x$, $y$, $z$ . . . which are also indicated on them, or the "negative unknown quantities" $-x$, $-y$, $-z$ . . . which are indicated on them too. There are also some weights representing either the fractions of the unknown quantities e.g. $x/2$, $y/3$ or their multiples, e.g. $2x$, $5y$. Such marks are also stamped upon the weights. The weights may be of various forms and made of different materials.

The balances are either of large size, in order to carry out the demonstrations on them in schools or of small size for the individual work of pupils.

The combined balance may be used for carrying out the following mathematical operations:

I. *Operations with positive and negative (relative) numbers*

These operations are:

(1) Comparison
(2) Addition
(3) Subtraction

The operations with these numbers are performed in a similar way to that used with positive numbers on the ordinary balance. Consequently, the advantage of the combined balance is the possibility of carrying out those operations both with positive and negative numbers, whereas on an ordinary balance it is possible to perform the same operations with positive numbers only.

II. *Determination of fundamental rules with equality and inequality*

The determination is achieved in the similar way as with an ordinary balance, but the advantage of the combined balance consists in the fact that it allows the operations to be carried out not only with positive but also with negative numbers. This makes possible to deduce also the rule concerning the change of the sign on the left and on the right side of an equality or an inequality, which cannot be done on an ordinary balance.

III. *Solving of linear equations with a single unknown quantity*

In the direction for use, appended to the set of weights, a whole series of simple linear equations is specified with the explanation for each particular equation by means of which "unknown quantity" from the set of weights it can be solved. The solving consists of the following procedure:

(1) The equation is set upon the balance by putting the left side of the equation on the left side of the balance and the right side of the equation on the right side of the balance. If on the left side of the equation stands, for instance $3x$, three weights marked with "$x$" have to be put on the scale with the mark "plus." If it were $-4x$, 4 weights marked with "$x$" should be placed on the scale with the mark "minus." The same procedure is applied with the known quantities. For the unit of known quantities is taken, for instance, a weight of 1 dkg. After the equation has been "set," its accuracy is verified by "letting loose" the balance. If the balance is in equilibrium, i.e. if the beams 10 and 11 form a sign of equality, the equation is correct. Such a test by "letting loose" the balance is carried out after each operation, preventing thus all mistakes, as the balance indicates them automatically.

(2) The transposition of terms to different sides of the equation is effected by transferring the weights corresponding to the known or unknown quantity we wish to transpose from one side of the balance to the other changing at the same time its sign, i.e. putting the weight which lays on the scale marked "plus" on the left side of the balance to the scale marked "minus" on its right side.

(3) The reduction of the equation is effected by taking off simultaneously both from the scale marked "plus" and from the scale marked "minus" on the same side of the balance an equal number of identical weights, for instance, if there are, on the left side of the balance, three unknown quantities "$x$" on the scale marked "plus" and five of them on the scale marked "minus." Three weights marked "$x$" are to be taken off from both scales on the left side of the balance, leaving only two weights "$x$" on the scale marked "minus."

(4) The change of signs of the left and the right side of the equation is achieved by transposing the contents of the scale marked "plus" on the left side to the scale marked "minus" on the same side and vice versa. The same procedure is applied to the right side of the balance.

(5) The determination of the unknown quantity from the equation thus simplified, e.g. $2x=5$ is done in the following way. In the first place, each known unit is "changed" into smaller parts so that the total number of these parts be divisible by the coefficient of the unknown quantity. After that each scale containing the weights is divided, by means of the above mentioned partitions, into as many compartments as there are units in the above mentioned coefficient and the "known" and the "unknown" quantities are distributed, on the same scale where they have previously been, in individual compartments so that each compartment of a scale should be equally loaded. Finally, the weights are to be taken off from all compartments of a scale except one of them. The same procedure has to be applied to both partitioned scales. In order to make the explanations clearer, there is set forth integrally an example for the solution of the equation with one unknown quantity. This equation being $x+2=3x-2$ whose solution is required. In order to "set" the equation on the balance, an unknown weight "$x$" should be placed on the scale pan 1, on the same scale pan are put also two known weight units, let us say of 1 dkg. This is done because all these quantities are positive and situated on the left side of the equation. Three unknown weights "$x$" are placed on the scale pan 22 and two known units on the scale pan 20, because the first quantities are positive and the second ones negative, both of them being situated on the right side of the equation. If the unknown weights "$x$" have been correctly chosen and the balance is, after putting all these weights upon it, in equilibrium, it means that the equation has been "set," i.e. evidently represented on the balance. Then its solution has to be undertaken. Three unknown weights are transferred from the scale pan 22 to the scale pan 6 and two known weight units from the scale pan 1 to the scale pan 20. Hereby is concluded the first step, transposition of weights, and the state of the balance corresponds to the equation $x-3x=-2-2$.

Now, an unknown weight "$x$" is taken off from each of the scale pans 1 and 6 and the state of the balance corresponds to the equation $-2x=-2-2$ or, which is identical, $-2x=-4$.

The next step consists in transferring two unknown weights "$x$" from the scale pan 6 to the scale pan 1 and four known weight units from the scale pan 20 to the scale pan 22. The state of the balance corresponds to the equation $2x=4$. Finally, an unknown weight "$x$" is taken off from the scale pan 1, while the other unknown weight "$x$" is left on the scale pan 1. In the same way, every second known weight is taken off from the scale pan 22, which means that two known weight units are taken off and the other two of these weights are left on the scale pan 22.

The state of the balance is represented by $x=2$ which is, at the same time, the solution of the given equation: $x+2=3x-2$.

IV. *Solution of a linear inequality with a single unknown quantity*

The solution is carried out in a completely similar way to the one used for solving the equations.

V. *Solution of a system of linear equations with two or more unknown quantities*

The solution can be effected by applying the method of substitution or the method of identical coefficients (method of reduction) according to previously expounded procedures.

What I claim and desire to secure by Letters Patent is:

1. A combined balance for solving equations and inequalities in which numerical values are represented by weights, said combined balance comprising a base, a balance having a horizontal balance beam centrally pivoted to an upright stand mounted in the center of said base, said pivot dividing said beam into two arms of equal length, two identical balance scales having smaller balance beams and stands than said first balance, each said smaller balance beam being pivoted to its respective stand as in said first balance, said identical balance scales mounted on said base symmetrically with respect to said center mounted balance and adjacent the ends of the horizontal balance beam of said center mounted balance, all said balance beams being approximately in the same vertical plane, lever means pivotally connecting the respective ends of said horizontal balance beam of said center mounted balance with the pivots of the balance beams of said identical balance scales, said lever means being rigidly fixed to said respective pivots of the smaller balance beams, and scale pans respectively suspended from the respective ends of said balance beams of said similar balance scales for receiving weights designated by one of the $+$ and $-$ mathematical signs, and the inner said scale pans for receiving weights designated by the other of said signs, whereby the positive and negative values on left side of an equation can be accurately represented in the left identical balance scale, and the values on the right side of the equation can be similarly represented on the right identical balance side, and indicating means on said center mounted balance for indicating the balance of the equation.

2. A combined balance as described in claim 1 characterized in that said indicating means comprises a horizontal indicator carried by the stand of said centrally mounted balance in vertical relationship with said pivot of said stand and balance beam, and a horizontal indicator and a vertical pointer carried by the balance beam of said centrally mounted balance and disposed in vertical relation to said pivot to form with said horizontal indicator carried by said stand the possible mathematical signs $=$, $>$, and $<$, as the case might be according to where said weights are placed in said scale pans and the resulting equilibrium or lack of it of the balance.

3. An educational aid in form of a combined balance for solving equations and inequalities and for reckoning with algebraic numbers by means of representative weights and comprising three beams with two equal arms each, each of said beams being rotative round respective pivots, lying approximately in the same vertical plane, three separate stands, for the respective pivoted support of said beams which are connected in a united kinematic system, the relationship between said beams being such that the left end of the middle beam is connected through accessory levers with the left beam and the right end of the said middle beam in the same way connected with the right beam, so that setting in motion one of the beams, sets in motion also the rest of the beams, and scale pans carried at the ends of the left and right beams, the outer pair of scale pans being indicated with plus (+) and the inner pair with minus (−) signs respectively, and indicator means for indicating the state of equilibrium of said middle beam.

4. A combined balance as described in claim 3 characterized in that said indicator means comprise; a short cross member firmly attached to the middle stand of the balance; a pointer centrally and vertically mounted on said middle beam and normal thereto; another short cross member mounted on said pointer, normal thereto and movable therewith, whereby both said cross members are parallel to form the sign of equality (=) intermediate said beam ends when the middle beam is in horizontal equilibrium, and are biased with respect to each other to form the signs of inequality (<, >) to indicate the greater and lesser weighted ends when the middle beam is out of horizontal equilibrium.

References Cited in the file of this patent

UNITED STATES PATENTS

| | | |
|---|---|---|
| 784,145 | Donecker | Mar. 7, 1905 |

FOREIGN PATENTS

| | | |
|---|---|---|
| 611,831 | Germany | Apr. 8, 1935 |